(12) United States Patent
Liu

(10) Patent No.: US 12,722,100 B2
(45) Date of Patent: Sep. 1, 2026

(54) RECYCLING AND PURIFYING STRUCTURE FOR DISTILLER

(71) Applicant: Feng-Yu Liu, Taichung City (TW)

(72) Inventor: Feng-Yu Liu, Taichung City (TW)

( * ) Notice: Subject to any disclaimer, the term of this patent is extended or adjusted under 35 U.S.C. 154(b) by 329 days.

(21) Appl. No.: 18/583,931

(22) Filed: Feb. 22, 2024

(65) Prior Publication Data

US 2025/0269297 A1 Aug. 28, 2025

(51) Int. Cl.

| | |
|---|---|
| ***B01D 3/14*** | (2006.01) |
| ***B01D 1/20*** | (2006.01) |
| ***B01D 5/00*** | (2006.01) |
| ***C02F 1/04*** | (2023.01) |
| *C02F 103/34* | (2006.01) |

(52) U.S. Cl.

CPC ................. *B01D 3/14* (2013.01); *B01D 1/20* (2013.01); *B01D 5/006* (2013.01); *C02F 1/04* (2013.01); *C02F 2103/346* (2013.01)

(58) Field of Classification Search

CPC ... B01D 3/14; B01D 1/16; B01D 1/20; B01D 3/26–28; B01D 3/34; C02F 1/04–043; C02F 2103/346

See application file for complete search history.

(56) References Cited

U.S. PATENT DOCUMENTS

| | | | | |
|---|---|---|---|---|
| 5,472,576 A * | 12/1995 | Berberi ................ | B01D 5/0036 202/202 |
| 2010/0274068 A1* | 10/2010 | Chung .................... | C02F 1/722 210/759 |
| 2016/0083267 A1* | 3/2016 | Hammon ............. | B01D 1/0058 261/128 |

* cited by examiner

*Primary Examiner* — Renee Robinson

(74) *Attorney, Agent, or Firm* — LANWAY IPR SERVICES; Chun-Ming Shih

(57) ABSTRACT

A recycling and purifying structure contains: a storage bucket configured to store waste liquids and a distilling body configured to distill the waste liquids. The storage bucket includes an inlet defined and an outlet. The distilling body is connected with the outlet and includes a first atomizing nozzle which has a feeding opening configured to produce large-molecular recycled waters, a second atomizing nozzle having a returning mouth for producing small-molecular recycled waters from the large-molecular recycled waters of the feeding opening. The distilling body further includes multiple filtering elements separately disposed between the first atomizing nozzle and the second atomizing nozzle, and a respective one filtering element has multiple screen elements. The distilling body includes a recycling tube connected on a center of a top of an outer wall thereof, and a bubble absorber mounted on the recycling tube to eliminate air bubbles of the small-molecular recycled waters.

6 Claims, 2 Drawing Sheets

RECYCLING AND PURIFYING STRUCTURE FOR DISTILLER

TECHNICAL FIELD

The present disclosure relates to a recycling and purifying structure for a distiller which is capable of accelerately recycling and purifying waste liquids.

BACKGROUND

Taiwan is a major semiconductor manufacturing country and contributes considerable output value every year, but it also produces a large amount of waste. Wastewater produced by IC manufacturing plants, and most of wastewater are discharged from cleaning wafers, removing photoresist and etching. In the era of circular economy, how to convert waste into raw materials is something that both industry and government should pay attention to.

A conventional distilling method and a distiller are disclosed in TW Patent No. 157517 and are applied to decrease a boiling point of waste waters in the stiller within 30° C. to 60° C., wherein the waste waters are vacuumed in the stiller and are condensed to waters from steams by a condenser.

However, such a method and distiller cannot produce recycled waters in small molecules from large molecules of the waste waters. In addition, the recycled waters cannot have high purity and flows in a quick flow rate.

The present invention has arisen to mitigate and/or obviate the afore-described disadvantages.

SUMMARY

A primary aspect of the present invention is to provide a recycling and purifying structure for a distiller which is capable of accelerately recycling and purifying waste liquids.

To obtain above-mentioned aspect, a recycling and purifying structure provided by the present invention contains: a storage bucket configured to store waste liquids and a distilling body configured to distill the waste liquids.

The storage bucket includes an inlet defined on a top of an outer wall thereof, and an outlet formed on the top of the outer wall of the storage bucket opposite to the inlet.

The distilling body is connected with the outlet of the storage bucket, and the distilling body includes a first atomizing nozzle which has a feeding opening configured to produce large-molecular recycled waters, a second atomizing nozzle arranged on a side of a top thereof and having a returning mouth for producing small-molecular recycled waters from the large-molecular recycled waters of the feeding opening.

The distilling body further includes multiple filtering elements separately disposed between the first atomizing nozzle and the second atomizing nozzle, and a respective one filtering element has multiple screen elements. The distilling body includes a recycling tube connected on a center of a top of an outer wall thereof, and a bubble absorber mounted on the recycling tube to eliminate air bubbles of the small-molecular recycled waters.

Preferably, the storage bucket further includes a motor fixed on a center of the top of the outer wall thereof and configured to drive a stirrer to rotate. The stirrer is vertically inserted into a bottom of an inner wall of the storage bucket and is configured to rotatably stir the waste liquids evenly, the storage bucket includes a circular tube fixed on a top of the inner wall thereof, multiple spray heads defined on the circular tube and configured to molecularize the waste liquids, multiple heaters arranged on the outer wall of the storage bucket away from the motor and configured to heat the water liquids in the storage bucket, and a discharge orifice defined on a center of a bottom of the inner wall of the storage bucket and configured to discharge the waste liquids.

Preferably, the distilling body further includes a filtration layer arranged above the first atomizing nozzle.

Preferably, the respective one filtering element is circular.

Preferably, the multiple screen elements are through holes.

Preferably, the multiple screen elements are meshes.

Other objects and features will be in part apparent and in part pointed out hereinafter.

DETAILED DESCRIPTION

Figure 1:
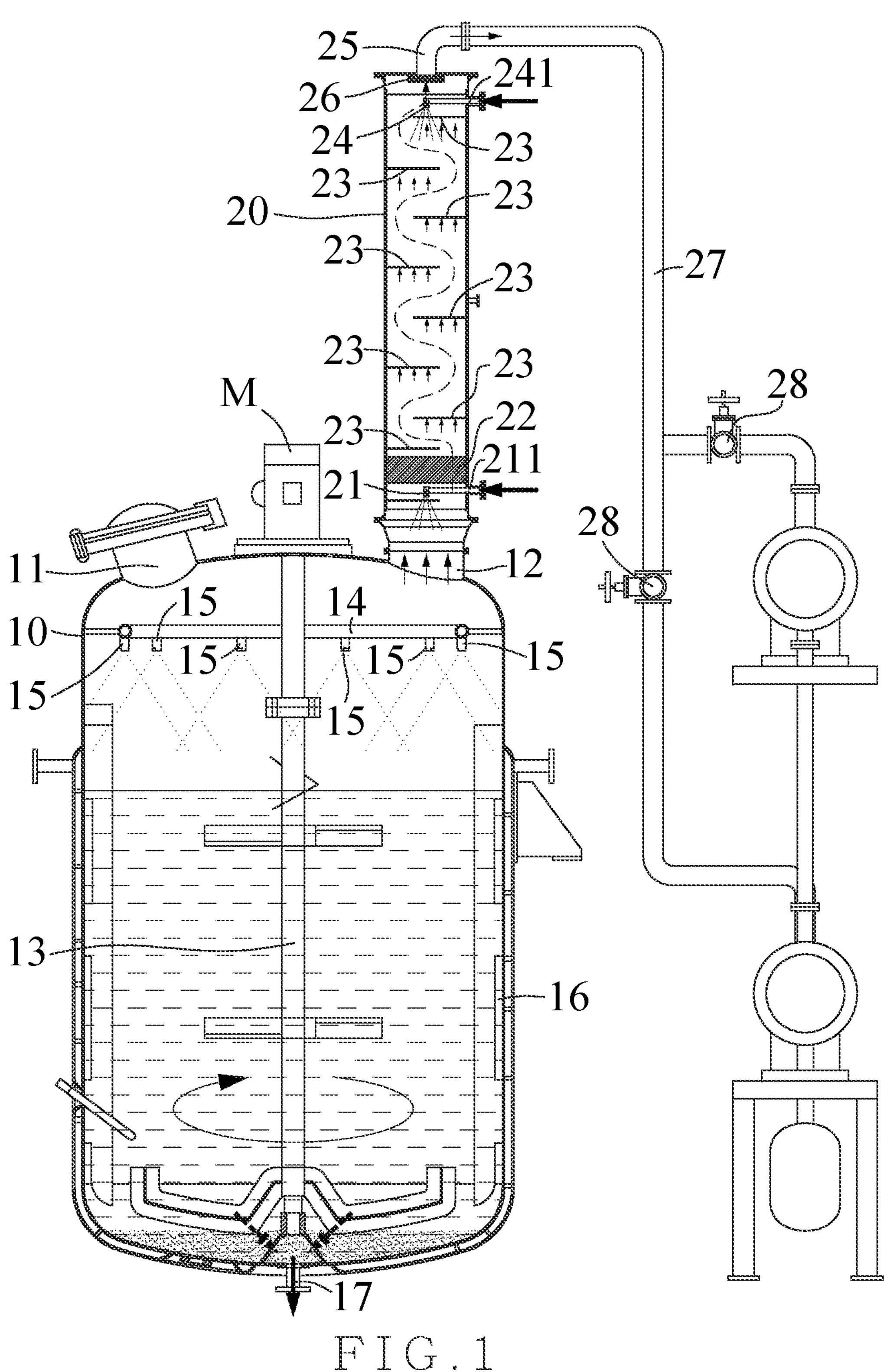
FIG. 1 is a cross sectional view showing the assembly of a recycling and purifying structure for a distiller according to a preferred embodiment of the present invention.

FIG. 1 is a cross sectional view showing the assembly of a recycling and purifying structure for a distiller according to a preferred embodiment of the present invention. The recycling and purifying structure comprises: a storage bucket 10 configured to store waste liquids and a distilling body 20 configured to distill the waste liquids.

The storage bucket 10 includes an inlet 11 defined on a top of an outer wall thereof, an outlet 12 formed on the top of the outer wall of the storage bucket 10 opposite to the inlet 11, a motor M fixed on a center of the top of the outer wall of the storage bucket 10 and configured to drive a stirrer 13 to rotate, wherein the stirrer 13 is vertically inserted into a bottom of an inner wall of the storage bucket 10 and is configured to rotatably stir the waste liquids evenly, the storage bucket 10 also includes a circular tube 14 fixed on a top of the inner wall thereof, multiple spray heads 15 defined on the circular tube 14 and configured to molecularize the waste liquids, multiple heaters 16 arranged on the outer wall of the storage bucket 10 away from the motor M and configured to heat the water liquids in the storage bucket 10, and a discharge orifice 17 defined on a center of a bottom of the inner wall of the storage bucket 10 and configured to discharge toxic solvents or cleaning fluids of the waste liquids, wherein the distilling body 20 is connected with the outlet 12 of the storage bucket 10.

The distilling body 20 includes a first atomizing nozzle 21 which has a feeding opening 211 configured to produce large-molecular recycled waters, a filtration layer 22 arranged above the first atomizing nozzle 21, and multiple filtering elements 23 separately disposed above the filtration layer 22, wherein a respective one filtering element 23 is circular and has multiple screen elements 231 which are through holes or honeycomb-shaped meshes so that recycled waters flow upward in an S-shaped path, thus molecularizing the recycled waters from the waste liquids. The distilling body 20 further includes a second atomizing nozzle 24 arranged on a side of a top thereof and having a returning mouth 241 for producing small-molecular recycled waters from the large-molecular recycled waters of the feeding opening 211, thus accelerating a flow rate of the recycled waters. The distilling body 20 includes a recycling tube 25 connected on a center of a top of an outer wall thereof, and a bubble absorber 26 mounted on the recycling tube 25 to eliminate air bubbles of the recycled waters, wherein the recycling tube 25 is connected with the recycling and purifying equipment via at least one connection pipe 27 and at least valve 28 to recycle the recycled waters from the waste liquids.

Figure 2:
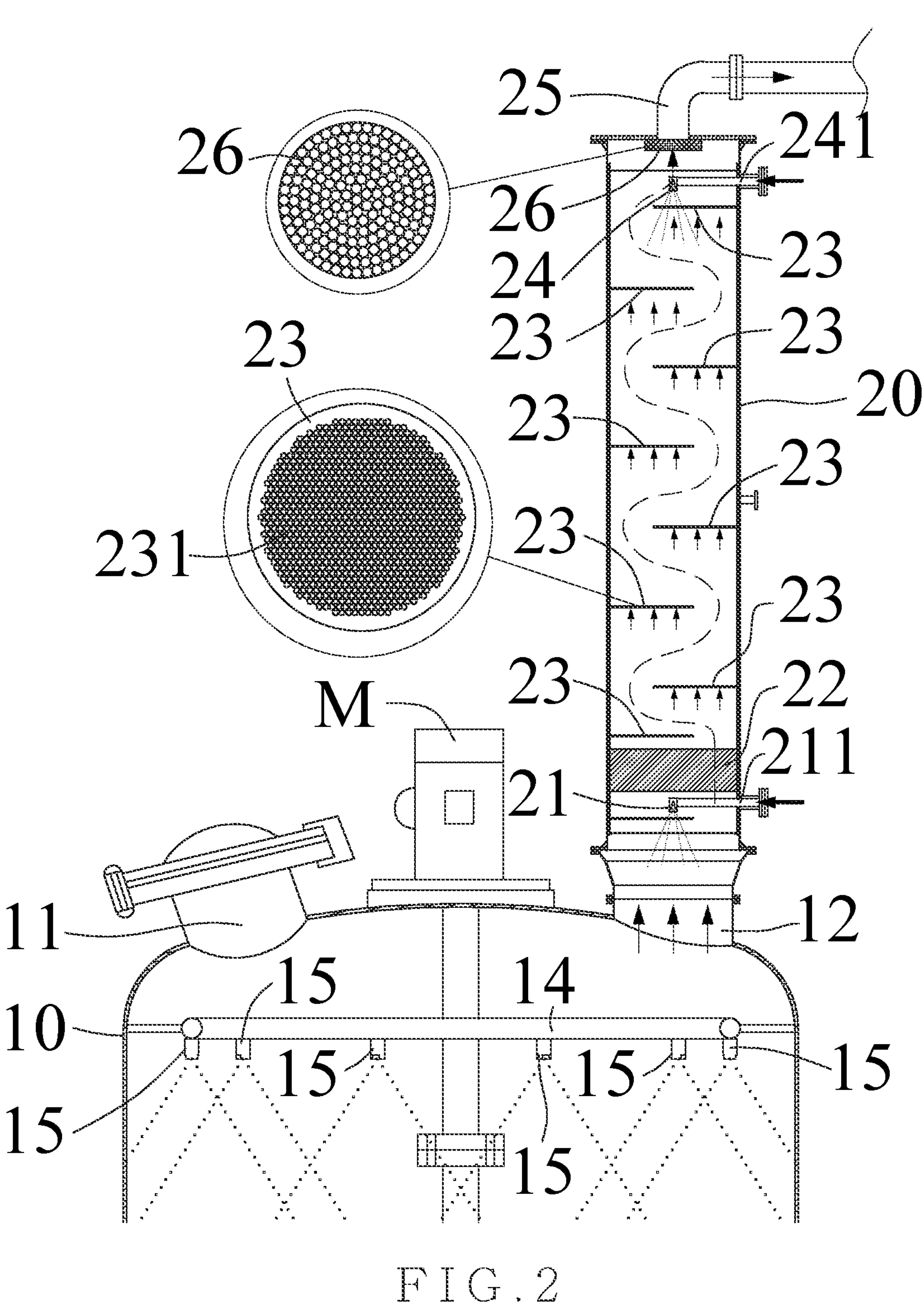
FIG. 2 is a schematic view showing the operation of the recycling and purifying structure for the distiller according to the preferred embodiment of the present invention.

FIG. 2 is a schematic view showing the operation of the recycling and purifying structure for the distiller according to the preferred embodiment of the present invention. The toxic solvents or cleaning fluids of the waste liquids in the storage bucket 10 are heated to produce steams by the stilling body 20. When the steams float upward, the feeding opening 211 of the first atomizing nozzle 21 sprays the large-molecular recycled waters from the recycled waters, thus enhancing purity of the recycled waters. In the meantime, the steams are sprayed out of the second atomizing nozzle 24 to produce the small-molecular recycled waters after flowing through the filtration layer 22, the S-shaped path, the multiple filtering elements 23 and the multiple screen elements 231, thus increasing the flow rate of the recycled waters. Thereafter, the small-molecular recycled waters produces the air bubbles and the air bubbles are eliminated by the bubble absorber 26 so as to be recycled via the at least one connection pipe 27 and the at least valve 28 from the recycling tube 25.

When introducing elements of the present invention or the preferred embodiments thereof, the articles “a”, “an”, “the” and “said” are intended to mean that there are one or more of the elements. The terms “comprising”, “including” and “having” are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A recycling and purifying structure comprising:

a storage bucket configured to store waste liquids and a distilling body configured to distill the waste liquids;

wherein the storage bucket includes an inlet defined on a top of an outer wall thereof, and an outlet formed on the top of the outer wall of the storage bucket opposite to the inlet;

wherein the distilling body is connected with the outlet of the storage bucket, and the distilling body includes:

a first atomizing nozzle which has a feeding opening configured to atomize recycled water into droplets;

a second atomizing nozzle arranged at an upper side thereof and having a return port;

wherein the distilling body further includes a plurality of filtering elements stacked between the first atomizing nozzle and the second atomizing nozzle, each of the filtering elements defining a plurality of honeycomb passages;

wherein the recycled water atomized by the first atomizing nozzle flows upward through the filtering elements and is directed to the return port of the second atomizing nozzle;

wherein the second atomizing nozzle is configured to atomize the recycled water received from the first atomizing nozzle after passing through the filtering elements into smaller droplets;

wherein the distilling body includes a recycling tube connected on a center of a top of an outer wall thereof, and a bubble absorber mounted on the recycling tube to eliminate air bubbles of the recycled water.

2. The recycling and purifying structure as claimed in claim 1, wherein the storage bucket further includes a motor fixed on a center of the top of the outer wall thereof and configured to drive a stirrer to rotate, wherein the stirrer is vertically inserted into a bottom of an inner wall of the storage bucket and is configured to rotatably stir the waste liquids evenly, the storage bucket includes a circular tube fixed on a top of the inner wall thereof, multiple spray heads defined on the circular tube and configured to molecularize the waste liquids, multiple heaters arranged on the outer wall of the storage bucket away from the motor and configured to heat the waste liquids in the storage bucket, and a discharge orifice defined on a center of a bottom of the inner wall of the storage bucket and configured to discharge the waste liquids.

3. The recycling and purifying structure as claimed in claim 1, wherein the distilling body further includes a filtration layer arranged above the first atomizing nozzle.

4. The recycling and purifying structure as claimed in claim 1, wherein each filtering element is circular.

5. The recycling and purifying structure as claimed in claim 1, wherein the plurality of honeycomb passages are through holes.

6. The recycling and purifying structure as claimed in claim 1, wherein the plurality of honeycomb passages are defined by meshes.

* * * * *